(12) United States Patent
Auer

(10) Patent No.: US 12,442,631 B2
(45) Date of Patent: Oct. 14, 2025

(54) METHOD AND DEVICE FOR MONITORING THE POSITION OF A SHAFT

(71) Applicant: KRISTL, SEIBT & CO. GESELLSCHAFT M.B.H., Graz (AT)

(72) Inventor: Christian Auer, Graz (AT)

(73) Assignee: KRISTL, SEIBT & CO. GESELLSCHAFT M.B.H., Graz (AT)

( * ) Notice: Subject to any disclaimer, the term of this patent is extended or adjusted under 35 U.S.C. 154(b) by 125 days.

(21) Appl. No.: 18/251,864

(22) PCT Filed: Mar. 3, 2022

(86) PCT No.: PCT/AT2022/060061
§ 371 (c)(1),
(2) Date: May 4, 2023

(87) PCT Pub. No.: WO2022/183232
PCT Pub. Date: Sep. 9, 2022

(65) Prior Publication Data
US 2024/0011761 A1    Jan. 11, 2024

(30) Foreign Application Priority Data
Mar. 4, 2021    (AT) .............................. A 50155/2021

(51) Int. Cl.
*G01B 7/31*    (2006.01)
(52) U.S. Cl.
CPC ...................... *G01B 7/31* (2013.01)
(58) Field of Classification Search
CPC ..... G01B 7/31; F16P 1/02; F16P 3/008; F16P 7/00; G01M 13/025; G01M 15/02; F16C 1/267; F16D 3/843; F16L 57/00
See application file for complete search history.

(56) References Cited

U.S. PATENT DOCUMENTS

| 5,412,999 A | 5/1995 | Vigmostad et al. |
| 2009/0223083 A1* | 9/2009 | LeCrone ................. F26B 13/14 |
| | | 384/129 |

(Continued)

FOREIGN PATENT DOCUMENTS

| CN | 208333871 U | 1/2019 |
| DE | 3532702 A1 | 3/1987 |

(Continued)

OTHER PUBLICATIONS

ISA European Patent Office, International Search Report Issued in Application No. PCT/AT2022/060061, Jun. 9, 2022, WIPO, 5 pages.

*Primary Examiner* — Lee E Rodak
*Assistant Examiner* — Zannatul Ferdous
(74) *Attorney, Agent, or Firm* — McCoy Russell LLP

(57) ABSTRACT

The invention relates to a method and a device for monitoring the position of a shaft of a test bench, wherein the shaft is accommodated in an enclosure which substantially encloses at least part of the shaft in the circumferential direction, wherein the enclosure has an inner surface facing the shaft and the inner surface is arranged so that it does not touch the shaft in an intended position of the shaft, wherein at least one conductor loop is arranged on the inner surface and transmits an electrical signal, preferably a closed-circuit current.

12 Claims, 3 Drawing Sheets

(56) References Cited

U.S. PATENT DOCUMENTS

| | | | | |
|---|---|---|---|---|
| 2015/0232097 A1* | 8/2015 | Luther | ............... | G01C 21/3415 |
| | | | | 701/1 |
| 2016/0229392 A1* | 8/2016 | Sugitani | ................. | B60K 6/365 |
| 2018/0079048 A1* | 3/2018 | Shen | ..................... | B24B 37/105 |
| 2018/0178762 A1* | 6/2018 | Szewczyk | ............. | B60S 1/3452 |
| 2018/0328760 A1* | 11/2018 | Ji | .......................... | H02K 11/21 |
| 2021/0311122 A1* | 10/2021 | Zhang | ................. | G01R 31/343 |

FOREIGN PATENT DOCUMENTS

| | | | | |
|---|---|---|---|---|
| DE | 10038767 C1 | 4/2002 | | |
| DE | 202009006408 U1 | 12/2009 | | |
| EP | 2236977 A1 | 10/2010 | | |
| EP | 2447318 A1 | 5/2012 | | |
| EP | 2230438 B1 | 5/2016 | | |
| EP | 3098395 A1 | 11/2016 | | |
| FR | 3078405 A1 * | 8/2019 | ............... | G01L 3/02 |

\* cited by examiner

METHOD AND DEVICE FOR MONITORING THE POSITION OF A SHAFT

CROSS REFERENCE TO RELATED APPLICATIONS

The present application is a U.S. National Phase of International Application No. PCT/AT2022/060061 entitled "METHOD AND DEVICE FOR MONITORING THE POSITION OF A SHAFT," and filed on Mar. 3, 2022. International Application No. PCT/AT2022/060061 claims priority to Austrian Patent Application No. A 50155/2021 filed on Mar. 4, 2021. The entire contents of each of the above-listed applications are hereby incorporated by reference for all purposes.

TECHNICAL FIELD

The invention relates to a method for monitoring the position of a shaft of a test bench, wherein the shaft is accommodated in an enclosure, which substantially encloses at least part of the shaft in the circumferential direction, wherein the enclosure comprises an inner surface facing the shaft and the inner surface is arranged in a contactless manner relative to the shaft, in an intended position of the shaft.

The invention further relates to a device for the protection of a shaft of a test bench from contact with an enclosure, which is provided for the accommodation of at least part of the shaft, wherein the enclosure is substantially closed in the circumferential direction, and has an inner surface, which faces the shaft and is arranged in a contactless manner relative to the shaft in an intended position of the shaft.

BACKGROUND AND SUMMARY

On test benches with rotating parts, for example, a drive machine or a drive train that is to be tested, also referred to as a test item, is connected to one or a plurality of dynamometers by way of shafts. Universal joint shafts, or constant velocity drive shafts, are used, for example, as the shafts. For safety reasons, these shafts are provided with an enclosure, also often referred to as a shaft guard or contact guard. The enclosure prevents any unintentional contact with the rotating shaft, and in the event of shaft fracture can help to minimise damage to the test bench and the test item. Furthermore, the enclosure can serve as a storage location for the shaft in the course of rebuilds of the test bench.

Such a contact guard is of known art from the prior art, for example from EP 2 230 438 B1. The contact guard of EP 2 230 438 B1 is constructed in a number of parts, and can be adapted to shafts of different shapes. Protective barriers are provided in the contact guard, which, in the event of a fracture of the shaft, trap the fragments, and thus prevent further serious damage to the test bench.

A misalignment of the shaft should be detected in good time in order to prevent damage, such as a fracture of the shaft. For example, a fracture of the suspension of the test item can lead to a misalignment of the shaft. If the shaft grinds against the enclosure over a long period of time, there is a risk of damage to the shaft and the enclosure, to the test item and the test bench, and also a risk of fire. However, since there is no shaft fracture, this fault cannot be detected by monitoring of a differential rotational speed.

A contact guard for shafts on test benches with a monitoring device is already of known art from CN 208 333 871 U. To monitor the alignment of the shaft, at least one distance sensor is provided, which on the one hand measures a distance between the shaft and a motor, and on the other hand measures a radial position of the shaft in the contact guard. The distance sensor can, for example, be an infrared sensor or a laser sensor. This method therefore requires comparatively complex and thus error-prone sensor technology. A test bench represents a very demanding environment for sensor technology of all kinds, due to the mechanical loads triggered, for example, by vibrations during operation of the shaft, and due to the frequent rebuilds.

It is an object of the invention to alleviate, or completely eliminate, the disadvantages of the prior art. In particular, it is an object of the invention to detect a misalignment of the shaft early, and by simple means, in order to be able to avert damage to the test bench and any risk to personnel.

This object is achieved by a method of the type described above, wherein at least one conductor loop is arranged on the inner surface of the enclosure and an electrical signal transmitted through the conductor loop, preferably a closed-circuit current, is measured to determine whether the conductor loop may have been severed. Thus, in particular, a misalignment of the shaft and any resulting grinding of the shaft on the enclosure can be detected before severe damage to the test bench and any risk to personnel occurs. If the shaft is misaligned, a conductor loop is severed by the shaft, and thereby an electrical signal transmitted through the conductor loop is interrupted. The electrical signal serves to monitor the condition of the shaft. An interruption of the signal is thus an indication of a misaligned shaft.

In order to be able to detect misalignment at different positions within the enclosure, a preferred form of embodiment provides that the electrical signal is measured in at least two conductor loops arranged at a distance from each other in the axial direction of the shaft.

Advantageously, a signal is emitted when the severance of a conductor loop is determined. The signal can, for example, be an acoustic, optical, or electrical, signal. This signal can as a consequence lead to further measures such as an emergency shutdown, or an alarm. The severance of a conductor loop and the interruption of the electrical signal transmitted through the conductor loop can also lead directly to a measure such as an emergency shutdown, or an alarm.

The object according to the invention is also achieved by a device of the type described above, in which at least one conductor loop is arranged on the inner surface of the enclosure. As already explained above in conjunction with the method according to the invention, a misalignment of the shaft can also be detected in a simple manner with the device according to the invention. If the shaft is in contact with the conductor loop due to its misalignment, the conductor loop is severed by the shaft, and thus an electrical signal transmitted through the conductor loop is interrupted.

In a preferred form of embodiment, the conductor loop is formed in or on a printed circuit board foil. This enables a cost-effective and very reproducible production of the conductor loop, leads to a great flexibility of the conductor loop, and thus to an easy assembly, and protects the conductor loop from unintentional damage or severance not caused by a misalignment of the shaft.

In another preferred form of embodiment, the printed circuit board foil comprises a plurality of conductor loops, preferably precisely two conductor loops. By the formation of at least two conductor loops, a certain level of redundancy is advantageously achieved. The monitoring of a plurality of conductor loops leads to a higher sensitivity in the detection of a misalignment.

The enclosure is preferably composed of an upper half-shell and a lower half-shell, wherein the upper half-shell is preferably pivotably mounted on the lower half-shell. This embodiment enables a particularly easy insertion of the shaft into the enclosure. During the insertion and the assembly of the shaft, the enclosure is opened and the upper half-shell is pivoted away from the lower half-shell. When the shaft is in operation, the upper half-shell is pivoted down onto the lower half-shell, and the enclosure is suitably locked. In addition, a protective switch can be provided, which allows operation of the shaft and the test bench only if the enclosure is closed and locked.

In order to be able to detect contact of the shaft with the inner surface of the enclosure in at least a subfield of the half-circumference, it is advantageous that at least one conductor loop is arranged on the inner surface of the upper half-shell, and at least one conductor loop is arranged on the inner surface of the lower half-shell. An increase in the number of conductor loops on the inner surface leads to an increased reliability in the detection of a misalignment of the shaft.

Two conductor loops, preferably arranged substantially diametrically, are preferably arranged at substantially the same height, as viewed in the direction of the axis of the shaft. With this feature, the probability of detecting a misalignment of the shaft in one direction can be increased.

In a preferred form of embodiment, at least two conductor loops are arranged such that the inner surface in at least one section is covered by conductor loops over substantially the entire circumference. This allows a misalignment of the shaft to be detected regardless of the direction of the displacement or the inclination of the shaft relative to its intended position.

In another preferred form of embodiment, a conductor loop is arranged adjacent to at least one end of the enclosure, preferably adjacent to both ends, as viewed in the direction of the axis of the shaft. By the arrangement of a plurality of conductor loops distributed over the inner surface of the enclosure, a misalignment can be detected regardless of the direction of displacement or the inclination of the shaft. The arrangement of conductor loops at one or both ends of the enclosure is particularly advantageous, since a radial displacement caused by an inclination of the shaft is most pronounced at the ends of the shaft, and consequently also at the ends of the enclosure. Thus, an inclination of the shaft relative to its intended position can typically first be detected at the ends of the enclosure.

In a preferred form of embodiment, the conductor loop, respectively each conductor loop, is connected to a measuring device, which in each case is set up to cause an electrical signal, preferably a closed-circuit current, to be transmitted through the conductor loop, and to detect an interruption of the electrical signal. An appropriately configured microcontroller or a multimeter is suitable as a measuring device, for example.

The inner surface is preferably formed on an inner cladding, which is accommodated in an outer jacket of the enclosure. The inner cladding can be designed in such a way that, in the event of a shaft fracture, the axis of rotation of the shaft parts can be held in the intended direction until it comes to a standstill. The inner cladding can thus prevent severe damage to the test bench.

BRIEF DESCRIPTION OF THE FIGURES

In what follows, the invention is explained in more detail by means of figures, to which, however, it is not intended to be limited. Here.

DETAILED DESCRIPTION

Figure 1A:
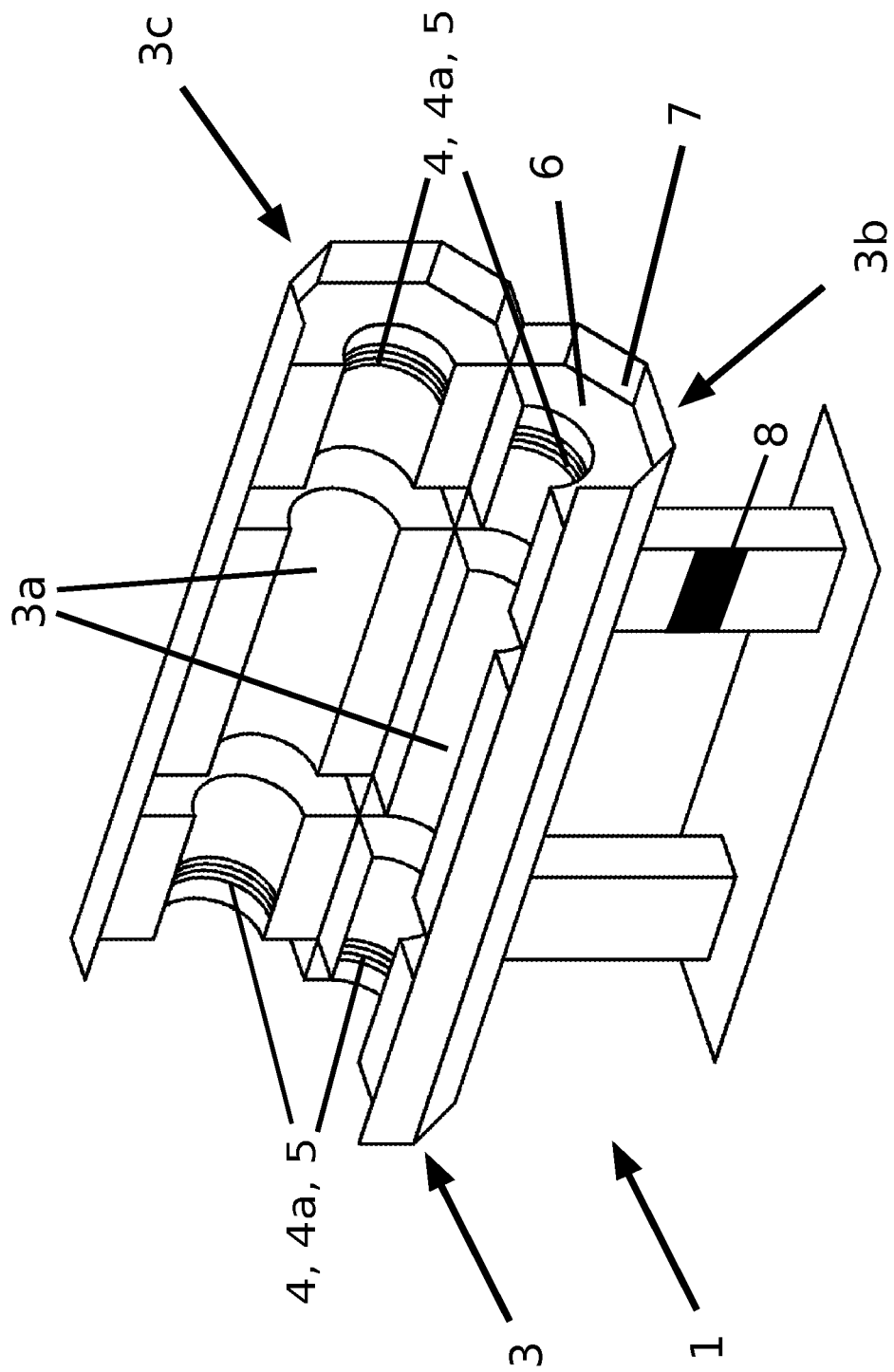
FIG. 1a shows an enclosure for a shaft on test benches, fitted with conductor loops.
Figure 1B:
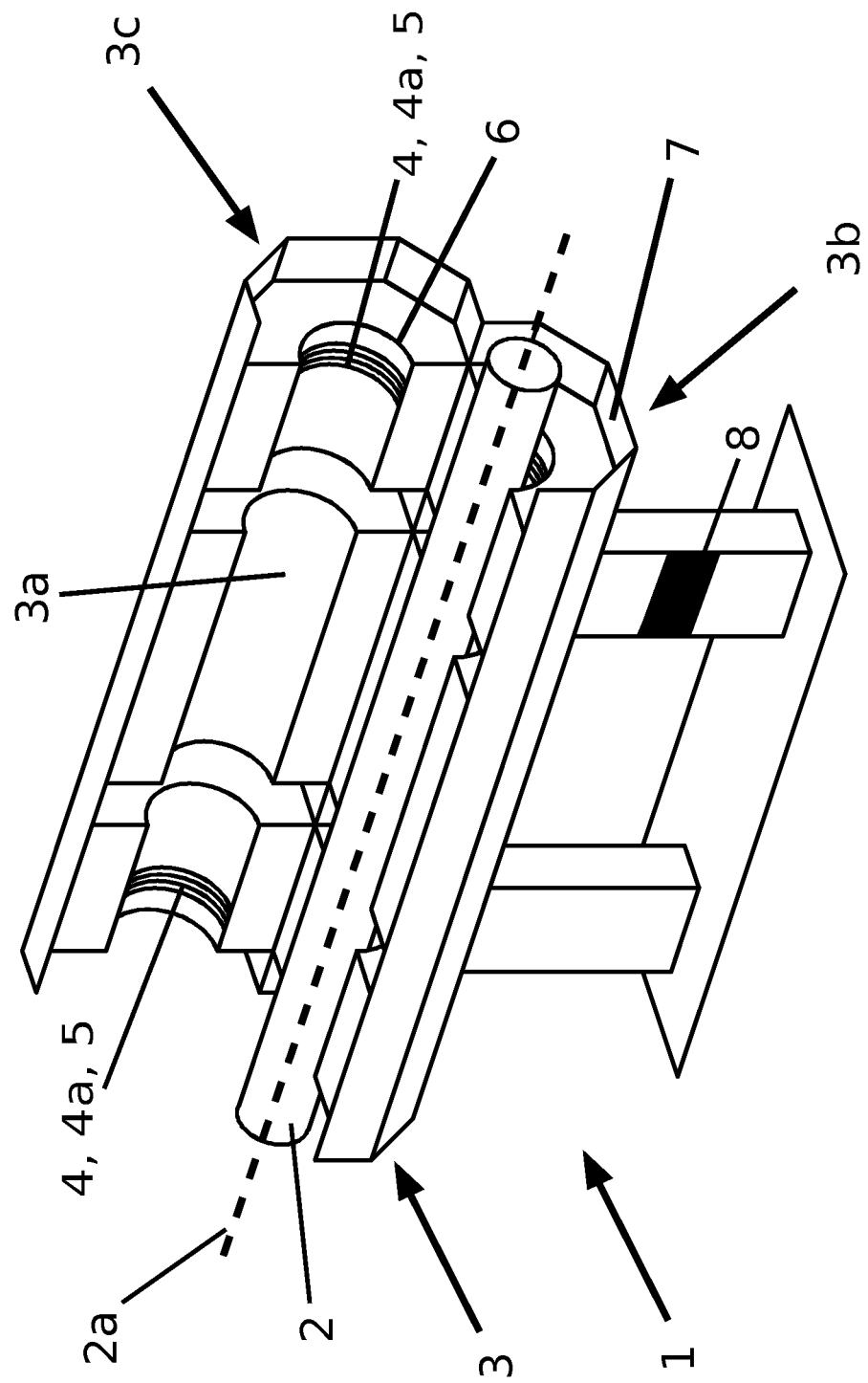
FIG. 1b shows the enclosure in FIG. 1a, with a shaft accommodated therein.

FIGS. 1a and 1b show a schematic representation of a device 1 for the protection of a shaft 2 of a test bench from contact with an enclosure 3, which is provided for the accommodation of at least part of the shaft 2, wherein the enclosure 3 is substantially closed in the circumferential direction. The enclosure 3 has an inner surface 3a facing the shaft, which in an intended position of the shaft is arranged in a contactless manner relative to the shaft 2. At least one conductor loop 4 is arranged on the inner surface 3a. The enclosure 3 is composed of a lower half-shell 3b and an upper half-shell 3c, wherein the upper half-shell 3c is pivotably mounted on the lower half-shell 3b.

FIGS. 1a and 1b show the enclosure 3 in the opened state. When the shaft is in operation, the upper half-shell 3c is pivoted down and rests on the lower half-shell 3b so as to form an enclosure 3 that substantially encloses the shaft. On the inner surface 3a of the upper half-shell 3c, and on the inner surface 3a of the lower half-shell 3b, in each case two conductor loops 4 are arranged, preferably in or on printed circuit board foils 4a. Here the conductor loops 4 cover the inner surface 3a substantially over the entire circumference of the enclosure 3. This enables a misalignment of the shaft 2 to be detected regardless of the direction of the displacement or the inclination of the shaft 2 relative to its intended position.

Furthermore, the conductor loops 4 are arranged adjacent to the two ends 5 of the enclosure 3, as viewed in the direction of the axis 2a of the shaft 2. This arrangement is particularly sensitive in the detection of an inclination of the shaft 2 relative to its intended position, since an inclination at the ends 5 of the enclosure 3 causes the greatest radial displacement of the corresponding section of the shaft 2.

The inner surface 3a is here formed on an inner cladding 6, which is accommodated in an outer jacket 7. Each conductor loop 4 is connected to a measuring device 8, which is set up to cause an electrical signal, preferably a closed-circuit current, to be transmitted through the conductor loop 4, and to detect an interruption of the electrical signal. If a misalignment of the shaft 2 occurs during operation of the shaft 2, the shaft 2 damages or severs one or a plurality of conductor loops 4. This leads to an interruption of the electrical signal, which is detected. As a consequence, a signal, such as a visual, acoustic or electrical signal, can be generated, and further measures, such as an alarm or an emergency shutdown of the test bench, can be initiated.

FIG. 1b shows the enclosure in FIG. 1a with a shaft 2 accommodated therein. The shaft 2 is located in its intended position and is arranged with no contact with the inner surface 3a.

Figure 2:
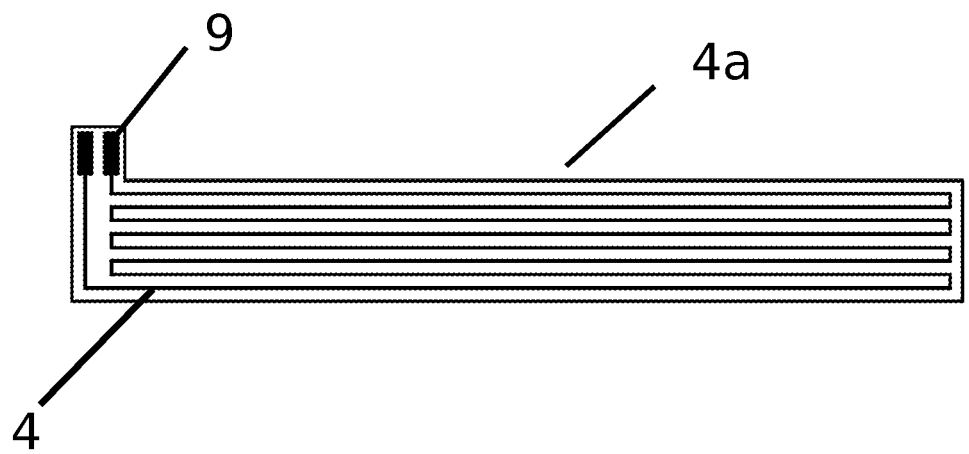
FIG. 2 shows a conductor loop in or on a printed circuit board foil.

FIG. 2 shows a conductor loop 4, which is formed in or on a printed circuit board foil 4a. Connections 9 are provided, with which contact can be made with the conductor loop 4. If the conductor loop 4 is severed by a misaligned shaft 2, an electrical circuit is interrupted and the conductor loop 4 is no longer able to transmit an electrical signal.

Figure 3:
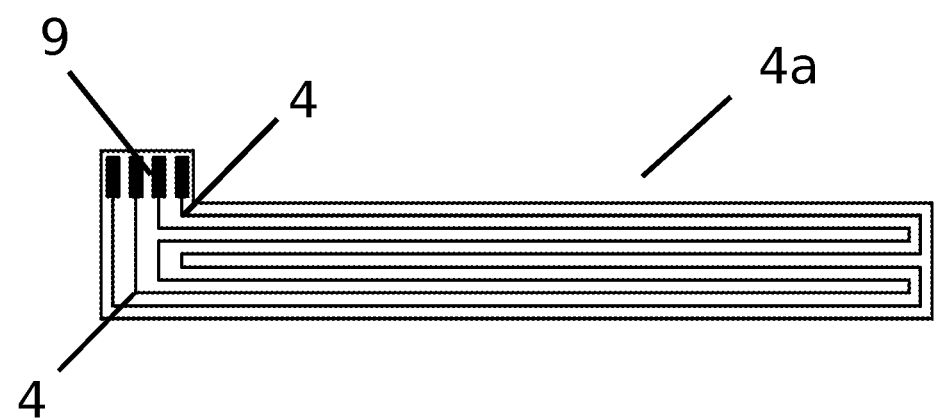
FIG. 3 shows a printed circuit board foil with two conductor loops.

FIG. 3 shows a printed circuit board foil 4a with two conductor loops 4. Two connections 9 for are provided for making contact with each of the conductor loops 4. Both conductor loops 4 can be used for monitoring. The monitoring by both conductor loops leads to a higher sensitivity in the detection of a misalignment.

The invention claimed is:

1. Device for the protection of a shaft of a test bench from contact with an enclosure, which is provided for the accommodation of at least part of the shaft, wherein the enclosure is closed in the circumferential direction and comprises an inner surface facing the shaft, which inner surface is set up to be arranged in a contactless manner relative to the shaft in an intended position of the shaft, wherein at least two conductor loops are arranged on the inner surface, wherein the conductor loop, respectively each conductor loop of the at least two conductor loops is coupled to a measuring device, which in each case is set up to cause an electrical signal to be transmitted through the conductor loop, and to detect an interruption of the electrical signal, wherein the enclosure is composed of an upper half-shell and a lower half-shell, wherein the upper half-shell is mounted on the lower half-shell, and wherein one conductor loop of the at least two conductor loops is arranged on the inner surface of the upper half-shell, and one conductor loop of the at least two conductor loops is arranged on the inner surface of the lower half-shell.

2. Device according to claim 1, wherein the at least two conductor loops are formed in or on a printed circuit board foil.

3. Device according to claim 2, wherein the printed circuit board foil comprises a plurality of conductor loops.

4. Device according to claim 3, wherein the printed circuit board foil comprises precisely two conductor loops.

5. Device according to claim 1, wherein the at least two conductor loops are arranged at the same height, as viewed in the direction of the axis of the shaft.

6. Device according to claim 5, wherein a conductor loop of the at least two conductor loops is arranged adjacent to at least one end of the enclosure as viewed in the direction of the axis of the shaft.

7. Device according to claim 6, wherein the conductor loop of the at least two conductor loops is arranged adjacent to both ends of the enclosure.

8. Device according to claim 5, wherein the at least two conductor loops are diametrically arranged.

9. Device according to claim 1, wherein the at least two conductor loops are arranged in such a way that at least one section of the inner surface is covered over the entire circumference by conductor loops.

10. Device according to claim 1, wherein the inner surface is formed on an inner cladding, which is accommodated in an outer jacket of the enclosure.

11. Device according to claim 1, wherein the electrical signal is a closed-circuit current.

12. Device according to claim 1, wherein the wherein the upper half-shell is pivotably mounted on the lower half-shell.

* * * * *